US012762325B2

(12) United States Patent
Chen et al.

(10) Patent No.: US 12,762,325 B2
(45) Date of Patent: Oct. 13, 2026

(54) ELECTRONIC DOCUMENT PROCESSING METHOD AND APPARATUS, TERMINAL, AND STORAGE MEDIUM

(71) Applicant: BEIJING ZITIAO NETWORK TECHNOLOGY CO., LTD., Beijing (CN)

(72) Inventors: Wei Chen, Beijing (CN); Baofa Li, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 134 days.

(21) Appl. No.: 18/279,560

(22) PCT Filed: Feb. 28, 2022

(86) PCT No.: PCT/CN2022/078351
§ 371 (c)(1),
(2) Date: Aug. 30, 2023

(87) PCT Pub. No.: WO2022/184024
PCT Pub. Date: Sep. 9, 2022

(65) Prior Publication Data
US 2024/0303414 A1 Sep. 12, 2024

(30) Foreign Application Priority Data
Mar. 1, 2021 (CN) ......................... 202110227810.0

(51) Int. Cl.
*G06F 40/166* (2020.01)
*G06F 3/04842* (2022.01)
*G06F 40/117* (2020.01)

(52) U.S. Cl.
CPC ........ *G06F 40/166* (2020.01); *G06F 3/04842* (2013.01); *G06F 40/117* (2020.01)

(58) Field of Classification Search
CPC ..................................................... G06F 40/166
See application file for complete search history.

(56) References Cited

U.S. PATENT DOCUMENTS 6,944,821 B1 * 9/2005 Bates et al. ............. G06F 15/00
7,899,829 B1 * 3/2011 Malla
(Continued)

FOREIGN PATENT DOCUMENTS

CN 102651016 A 8/2012
CN 103116616 A 5/2013
(Continued)

OTHER PUBLICATIONS

Written Opinion for International Application No. PCT/CN2022/078351, mailed Apr. 28, 2022, 7 Pages.
(Continued)

*Primary Examiner* — James J Debrow
(74) *Attorney, Agent, or Firm* — BakerHostetler

(57) ABSTRACT

The present disclosure provides an electronic document processing method and apparatus, a terminal, and a storage medium. An electronic document processing method, comprising: in a display interface of a first document, in response to a first operation, determining target document content associated with the first operation in the first document, the target document content being partial content of the first document, the partial content comprising at least one content block, and the content block being a unit for carrying the content of the first document; and in response to a second operation, collecting the target document content on the basis of the content block comprised in the target document content. It is available to collect partial content in an electronic document, and there is no need to collect the whole electronic document, such that accurate positioning and collecting are achieved, information is more compact.

19 Claims, 4 Drawing Sheets

(56) References Cited

U.S. PATENT DOCUMENTS

| | | | | |
|---|---|---|---|---|
| 10,943,059 | B2 * | 3/2021 | Yao et al. | G06F 17/24 |
| 2004/0010755 | A1 * | 1/2004 | Hamada | G06F 17/21 |
| 2004/0179220 | A1 * | 9/2004 | Van Oosterhout | G06F 15/00 |
| 2008/0263049 | A1 | 10/2008 | Hind et al. | |
| 2013/0246901 | A1 | 9/2013 | Massand | |
| 2014/0365555 | A1 | 12/2014 | Jwalanna | |
| 2019/0138587 | A1 | 5/2019 | Silk et al. | |
| 2020/0004808 | A1 | 1/2020 | Yao et al. | |
| 2020/0053176 | A1 | 2/2020 | Jimenez et al. | |
| 2020/0233879 | A1 * | 7/2020 | Papanicolaou et al. | G06F 16/27 |

FOREIGN PATENT DOCUMENTS

| | | | |
|---|---|---|---|
| CN | 105260433 | A | 1/2016 |
| CN | 105279245 | A | 1/2016 |
| CN | 106095985 | A | 11/2016 |
| CN | 106445321 | A | 2/2017 |
| CN | 106970758 | A | 7/2017 |
| CN | 107787491 | A | 3/2018 |
| CN | 111078655 | A | 4/2020 |
| CN | 112286890 | A | 1/2021 |
| CN | 112328853 | A | 2/2021 |
| CN | 112380819 | A | 2/2021 |

OTHER PUBLICATIONS

International Patent Application No. PCT/CN2022/078351; Int'l Search Report; dated Apr. 28, 2022; 3 pages.

* cited by examiner

ELECTRONIC DOCUMENT PROCESSING METHOD AND APPARATUS, TERMINAL, AND STORAGE MEDIUM

CROSS REFERENCE

The present application is the U.S. National Stage of International Application No. PCT/CN2022/078351, filed on Feb. 28, 2022, which claims the priority of Chinese patent application with the application number of 202110227810.0, filed on Mar. 1, 2021 and titled "ELECTRONIC DOCUMENT PROCESSING METHOD AND APPARATUS, TERMINAL, AND STORAGE MEDIUM", the disclosures of both of which are hereby incorporated by reference in their entireties.

TECHNICAL FIELD

The present disclosure relates to the field of computer technology, in particular to an electronic document processing method and apparatus, a terminal, and a storage medium.

BACKGROUND

With the development of computer technology, electronic documents are widely used. Electronic documents are usually stored in servers or locally, and users can edit and view the electronic documents.

SUMMARY

The present disclosure provides an electronic document processing method and apparatus, a terminal, and a storage medium.

The present disclosure uses the following technical solutions.

In some embodiments, the present disclosure provides an electronic document processing method, comprising:

in a display interface of a first document, in response to a first operation, determining target document content in the first document that is associated with the first operation, wherein the target document content is some content of the first document, the some content comprises at least one content block, and each content block is a unit used for carrying content of the first document; and in response to a second operation, collecting the target document content based on the content block comprised in the target document content.

In some embodiments, the present disclosure provides an electronic document processing apparatus, comprising:

a determining unit configured to, in a display interface of a first document, in response to a first operation, determine target document content in the first document that is associated with the first operation, wherein the target document content is some content of the first document, the some content comprises at least one content block, and each content block is a unit used for carrying content of the first document; and a collection unit configured to, in response to a second operation, collect the target document content based on the content block comprised in the target document content.

In some embodiments, the present disclosure provides a terminal, comprising: at least one memory and at least one processor, wherein the at least one memory is configured to store program code, and the at least one processor is configured to call the program code stored in the at least one memory to perform the method above.

In some embodiments, the present disclosure provides a storage medium, the storage medium storing program code, and the program code being used for performing the method above.

The electronic document processing method provided in the embodiments of the present disclosure can collect some content in an electronic document, does not need to collect the entire electronic document, achieves precise locating and collection, and enables information to be more compact, thereby improving user experience.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended marks indicate identical or similar elements. It should be understood that the accompanying drawings are schematic and that the elements and components are not necessarily drawn to scale.

DETAILED DESCRIPTION OF PREFERRED EMBODIMENTS

Embodiments of the present disclosure will be described in greater detail below with reference to the accompanying drawings. While certain embodiments of the present disclosure are shown in the accompanying drawings, it should be understood that the present disclosure may be implemented in various forms and should not be construed as being limited to the embodiments set forth herein, but instead are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in sequence and/or in parallel. In addition, the method embodiments may include additional steps and/or omit to perform the steps illustrated. The scope of the present disclosure is not limited in this regard.

As used herein, the term "including" and variations thereof are open-ended, i.e., "including, but not limited to". The term "based on" is "based, at least in part, on". The term "an embodiment" means "at least one embodiment"; the term “another embodiment” means “at least one additional embodiment”; the term “some embodiments” means “at least some embodiments”. Definitions of other terms will be given in the description below.

Note that the concepts “first” and “second” mentioned in this disclosure are used only to distinguish between different devices, modules or units, and are not intended to define the order or interdependence of the functions performed by these devices, modules or units.

It should be noted that the reference to “one” in this disclosure is intended to be schematic and not limiting, and it should be understood by those skilled in the art to mean “one or more” unless the context clearly indicates otherwise.

The names of the messages or information interacting between the multiple devices in this disclosure are for illustrative purposes only and are not intended to limit the scope of those messages or information.

The embodiments of the present application are described in detail below in conjunction with the accompanying drawings.

With the development of computer technology, electronic documents are widely used, especially for collaborative work. When browsing important electronic documents, users often use collection functions to collect the electronic documents for easy reading or use next time.

Figure 1:
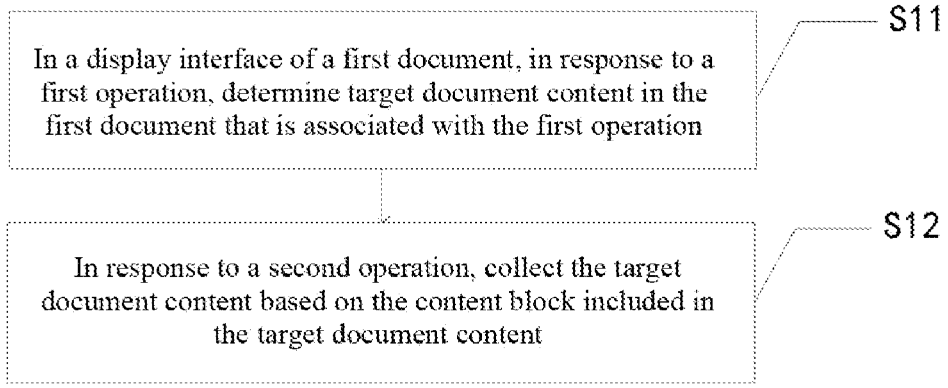
FIG. 1 is a flowchart of an electronic document processing method according to an embodiment of the present disclosure.

In an embodiment of the present disclosure, an electronic document processing method is provided, which may be used for a first client. The first client may be software or hardware. As shown in FIG. 1, the method includes steps S11 and S12 as follows.

S11: In a display interface of a first document, in response to a first operation, determine target document content in the first document that is associated with the first operation.

In some embodiments of the present disclosure, the first document is an electronic document, such as an on-line or off-line electronic document. The first document displays content, and the target document content is some content of the first document. The some content includes at least one content block, and each content block is a unit used for carrying the content of the first document, for example, the content block may be a line, a paragraph, a different content unit distinguished according to a preset input symbol. For example, two consecutive content units are distinguished through a carriage return or the like, and a paragraph may be a content block. In some embodiments, the first document is a structured document and includes a plurality of content blocks, and the content blocks may include various forms such as text or images. In practical work, electronic documents often have certain structural compositions. An electronic document is composed of one or more predetermined portions, and each portion has respective logic and content. Therefore, the configuration of content blocks as units to carry the content of the first document is more suitable for people’s usage habits and facilitates subsequent flexible processing of the document content. The first operation may be, for example, a selection operation. The selection operation may be implemented by dragging a mouse or a selection box, or by triggering a control associated with a content block. A user may perform the first operation on some content in the first document, or on the control associated with the content block in the first document. The target document content may be determined according to the first operation and the operated content. For example, the first operation may be one or more of click, box selection, gesture command, and voice command. The target document content may be continuous content in the first document or discontinuous content at multiple location in the first document.

S12: In response to a second operation, collect the target document content based on the content block included in the target document content.

In some embodiments, the second operation may be a collection operation. For example, the electronic document may display a collection identifier, and the second operation may trigger the collection identifier to collect the target document content. The target document content is collected based on the content block included in the target document content. For example, collection information of the target document content may be determined based on the content block included in the target document content.

If an entire electronic document is collected, the collected electronic document will be viewed. However, in some cases, a user may be interested in only some content of an electronic document rather than the entire electronic document, so the entire electronic document does not need to be collected. In other cases, a user may be interested in a plurality of portions of an electronic document. If only the entire electronic document can be collected, the portions of interest cannot be distinguished. As only the entire electronic document can be collected, two different portions of the electronic document correspond to the same link. Even if the two portions are collected twice, only the same link is obtained, and the user also needs to record the portions of interest, causing inconvenient usage and waste of storage space for the user. In some embodiments of the present disclosure, the collection of some content in the electronic document can avoid collection of the entire electronic document and achieve precise locating and collection. On the other hand, when the user is interested in a plurality of portions of an electronic document, he may collect the content of the plurality of portions separately, whereby user experience is greatly improved compared with the method of collecting the entire document and then recording the portions of interest.

In some embodiments of the present disclosure, the method further includes: collecting the first document in response to a collection operation on the first document. In some embodiments of the present disclosure, overall collection of the first document is also supported, and the user may choose to collect the entire first document or some content in the first document according to user needs.

In some embodiments, because the content collected by the user may be either the first document or some content in the first document, a data type of collected data may be first determined during collection, the data type including a document type or a content block type, that is, whether the document or some content in the document is collected is determined. In this way, collections may be classified, for example, collected content blocks may be automatically classified together, collected documents may be classified together, and the collected content blocks may be further classified based on collection information of the collected content blocks, such as classified according to documents they belong to, to facilitate user search. For different data types, display styles in a collection area are different to distinguish whether the collections are documents or some content.

In some embodiments of the present disclosure, in response to a second operation, collecting the target document content based on the content block included in the target document content includes: collecting the target document content in response to an operation on a collection control, where the collection control is displayed in response to the first operation or displayed at an associated position of the content block; or collecting the target document content in response to receiving a collection gesture or voice command. In some embodiments, the collection control is used for collection. The collection control may be displayed in response to the first operation, for example, displayed in a case that the content of the first document is selected, which reduces the occupation of a display area when collection is not required. The collection control may alternatively be displayed at the associated position of the content block, for example, displayed on the periphery of the content block, whereby a corresponding collection control may be configured for each content block to facilitate the collection of the control block. In some embodiments, the style of the collection control for the content block varies with the status of the content block. For example, the style of the content block before collection is different from that after collection, whereby the user may determine through the style of the control whether the content block has been collected to avoid repeated collections. In some embodiments, the second operation is a voice operation or gesture operation. The target document content may be collected in a case that a collection gesture or voice command is detected, and the collection control does not need to be displayed, thereby reducing the quantity of controls in the document and saving space.

In some embodiments of the present disclosure, in response to a first operation, determining target document content that is associated with the first operation includes: in response to a selection operation on some content in the first document, determining the some content as the target document content. In some embodiments, the content of the first document may be selected by dragging through a mouse or selecting a box on the first document, and the selected content is directly used as the target document content to be collected, whereby the user may easily and intuitively determine the collected content. In other embodiments, in response to a trigger operation on a collection control associated with the some content, the some content is determined as the target document content. In some embodiments, the first document includes content blocks, and different content blocks have corresponding collection controls. Therefore, the target document content may be directly selected by triggering the collection controls. This method may facilitate selection, especially in cases where the content of the content blocks is much or crosses pages, and may reduce operational complexity.

In some embodiments of the present disclosure, the content block has identification information; and in response to a second operation, collecting the target document content based on the content block included in the target document content includes: obtaining the identification information of the content block included in the target document content, and storing the identification information of the content block in a collection database. In some embodiments, the identification information of the content block may be an identity identifier (such as ID) of the content block. The identification information of the content block may be unique, and different content blocks may have different identification information. The identification information is used for determining the corresponding content block. When the target document content is collected, data of the entire target document content do not need to be saved, and only the identification information of the content block of the target document content is collected. In some embodiments, the identification information of the content block may be generated when the content block is created, or generated when a preset processing operation is performed, for example, generated during collection. The collection database may be configured locally or in a server, for example. According to this embodiment of the present disclosure, identification information is configured for each content block in the first document, and the first document may also have document identification information. Because the content block has identification information, the full text of the first document does not need to be obtained when the content block is located, but the content block may be specified, thereby reducing the path. Because the identification information of the content block is collected, when the content block indicated by the identification information of the content block changes, the collected identification information of the content block remains unchanged and does not need to be re-collected, thereby achieving the function of dynamically updating the collected content.

In some embodiments of the present disclosure, the method further includes: in response to a first trigger operation, obtaining and outputting collected content block information based on the identification information of the content block stored in the collection database; and in response to a second trigger operation on the collected content block information, processing the content block selected by the second trigger operation in a manner corresponding to the second trigger operation. In some embodiments, the first trigger operation may be an operation of opening a collection list, calling up the collection list through a control or menu, or calling up the collection list through a specific gesture operation, so as to display the content block information. The output content block information is generated based on the identification information of the content block, and may have a style, the style including one or more of creation time, thumbnail information of the associated target document content, update time of the target document content, and an author of the target document content. The second trigger operation may be performed for the output content block information. The second trigger operation may include one or more operations. Different second trigger operations have different processing manners, and the content block information is processed according to the processing manner corresponding to the second trigger operation. For example, when the second trigger operation is an opening operation, the content block corresponding to the content block information is opened. When the second trigger operation is a delete operation, the content block information is deleted.

In some embodiments of the present disclosure, processing the content block selected by the second trigger operation in a manner corresponding to the second trigger operation includes: determining the selected content block based on the second trigger operation and an insertion position of the selected content block in a target document; and inserting the selected content block into the insertion position in the target document. In some embodiments, the second trigger operation may include one or more operations, the second trigger operation may include a drag operation, and the content block is inserted into the target document by dragging the collected content block information. For example, the collection list has a link corresponding to the content block (content block information), the content block associated with the link may be inserted into the target document by performing the second trigger operation on the link in the collection list, such as a drag operation, and the content block does not need to be copied after being opened through the link, thereby greatly reducing user's operation steps and improving user experience.

In some embodiments of the present disclosure, inserting the selected content block into the insertion position includes: establishing an association relationship between the selected content block and the target document, and displaying the content block based on the association relationship. In some embodiments, after the content block is inserted into the target document, the content block in the first document has an association relationship with the target document, where the association relationship may be in various forms. In some embodiments, establishing an association relationship between the selected content block and the target document includes: maintaining an attribution relationship between the selected content block and the document to which the content block belongs unchanged, and establishing a reference relationship or connection relationship between the selected content block and the target document. In some embodiments, the content block always belongs to the first document, and there may be the reference relationship or connection relationship between the content block and the target document. The reference relationship may include: when a first content block of the first document is referenced by a second document, both the first document and the second document display the first content block and may achieve one-way or two-way synchronization, for example, amendment to the first content block in the first document may be synchronized to the second document, and/or amendment to the first content block in the second document may be synchronized to the first document, where the first content block is any content block in the first document. The connection relationship may include: when a second content block of the first document is connected to the second document, a connection identifier of the second content block may be displayed in the second document, and in response to triggering the connection identifier, content of the second content block may be obtained and displayed in the second document, where the second content block may be any content block in the first document. Therefore, in some embodiments, the established association relationship between the content block and the target document may cooperatively process the electronic document, and the same content block may be edited in different documents, thereby achieving automatic synchronization without opening the other document.

In some embodiments, inserting the selected content block into the insertion position includes: displaying the content block in a first preset style at the insertion position; or displaying the identification information of the content block in a second preset style at the insertion position, obtaining content of the content block based on the identification information of the content block in response to a trigger operation on the identification information, and displaying the content of the content block. In some embodiments, when the content block is inserted into the insertion position, the content block itself may be inserted into the insertion position and displayed in a preset style, where the preset style may be different from a style of non-inserted text of the target document content, such as an oblique style, which distinguishes the content block from other content in the target document and enables the user to determine which content is the inserted content block. In other embodiments, the identification information of the content block is inserted into the insertion position, and the content of the content block can be obtained through the identification information of the content block and displayed, where the identification information of the content block is displayed in the second style to distinguish from other non-inserted content blocks, for example, the second style is an underline style. For example, the collected content block may be inserted into a target position of the second document by dragging the collected content block to the target position of the second document.

In some embodiments of the present disclosure, outputting collected content block information includes: outputting content information or identification information of the content block and at least one of the following: information of the document to which the content block belongs; collector information, collection time information, or collection tag information of the content block; and information of the first document. In some embodiments, the information of the document to which the content block belongs may be either the first document or not. In order to ensure the manageability of the content block and reduce operation conflicts and the like, content blocks usually belong to one document. For example, the collector information of the content block is a user name that performs the collection operation, and the collection tag information is a user-defined tag. The user may set tags for different collections to distinguish collected content. The information of the first document includes, for example, a title or content introduction of the first document.

In some embodiments of the present disclosure, collecting the target document content includes: sending a data type and content block identifier of the collected content to the server, where the data type includes a content block type. In other embodiments, the present disclosure may further collect a document, and therefore may further include: in response to a third operation of collecting the first document, sending a data type and document identifier of the collected first document to the server, where the data type of the first document includes a document type. In some embodiments, when a document or a content block in a document is collected, communication with the server is performed to send a data type and identifier, where the data type is used for informing the server whether a document or a content block is collected, and the content block identifier and the document identifier are used for informing the server of the collected specific content, so that the server can store collection records according to the identifiers, and the user can retrieve the collection records from the server at any time.

In some embodiments of the present disclosure, after the target document content is collected, a target collection identifier associated with the target document content is displayed in the collection area. In some embodiments, the collection area may be a collection list or collection space, and the target collection identifier may be an identifier triggered to display the target document content, such as an icon, so that the user can view and manage the collection at any time. In some embodiments, the target collection identifier includes at least one of content generated according to the target document content, first document information where the target document content is located, update time of the target document content, and creation time of the target collection identifier. In some embodiments, an introduction may be generated according to the target document content, or the title of the first document may be recorded in the collection identifier, so that the collected relevant information may be determined through the collection identifier.

In some embodiments of the present disclosure, the method further includes: in response to a fourth operation on the target collection identifier, opening the first document and locating the target document content; or in response to a fourth operation on the target collection identifier, opening the first document, displaying the target document content, and hiding some or all content except the target document content, so as to reduce the occupation of resources such as display space by other content and reduce user's operation costs of searching and locating the target document content.

In some embodiments of the present disclosure, the fourth operation may be an opening operation, such as opening by clicking with a mouse. After the target collection identifier is opened, the first document is opened and the target document content is automatically located, that is, the target document content appears in the display area, and the user does not need to manually slide to the position of the collected target document content. In other embodiments, when the fourth operation is performed on the target collection identifier, only the target document content in the first document is displayed, while other content except the target document content is not displayed, whereby the user may quickly determine the collected content, fewer resources are occupied, permission management is facilitated, and content that is inconvenient to display is hidden.

In some embodiments of the present disclosure, the method further includes: in response to a fifth operation on the target collection identifier, inserting a target reference identifier or target connection identifier associated with the target document content into the second document, where the target reference identifier is used for displaying the target document content in a preset style, and the target connection identifier is triggered to display the target document content. In some embodiments, the fifth operation may be a reference operation or insertion operation, for example, the target collection identifier may be dragged into the second document to realize the function of inserting the target reference identifier or target connection identifier. The target reference identifier may be displayed in a reference style, and the reference style may include at least one of a reference source document, reference update time, and referenced content. The target connection identifier is associated with the target document content, and the target connection identifier is used for opening the target document content. For example, the target connection identifier includes a content block identifier linked to the target document content. For example, the target connection identifier may be clicked to open the target document content. The target connection identifier may be displayed in a connection style including a rendered icon, and may display a title with the target document content. It should be noted that, when the target connection identifier is triggered to display the target document content, only the target document content is displayed without opening the first document. In some embodiments, different content blocks in the first document may be stored independently of the first document, and only positions of the different content blocks in the first document are recorded in the first document. When any or more of the content blocks need to be opened, the first document does not need to be opened, which may reduce a volume of processed data, prevent leakage of other data in the first document when a target document area is referenced, and achieve differentiated permission management.

In some embodiments of the present disclosure, inserting a target reference identifier associated with the target document content into the second document includes: sending a content block identifier and inserted location information of the target document content to the server, so that the server establishes an association relationship between the second document and the target document content. In some embodiments, the user may view the second document in different terminals, and the second document may not only reference to one other document. For example, the second document may also reference to other document content besides the first document. Therefore, when the second document is opened, which documents the second document references need to be known, if document content referenced by the second document is recorded in advance in the server, the referenced content may be learned and loaded in advance from the server. Moreover, because the association relationship with the referenced document content is recorded, which content the second document references can be known without opening the second document, whereby the response speed can be improved when relevant information of the second document is queried. Therefore, in some embodiments, when any document is opened, a list of association relationships of the document is obtained from the server to receive relevant information of the content blocks referenced in the opened document.

In some embodiments of the present disclosure, after the target document content in the first document is amended, the target document content in the second document is correspondingly amended; and/or after the target document content in the second document is amended, the target document content displayed in the first document is correspondingly amended. In some embodiments, the target document content in the first document is associated with the target document content displayed in the second document, and the two are automatically synchronized. This enables different users to edit the same portion in different documents, achieves collaborative work, and does not require operations such as copying and pasting after amendment. Because collaborative work can be implemented without operating the same document, the convenience of operation is improved, and permission management can be conveniently implemented. When other users are not allowed to view the entire content of the first document, only some content in the first document is collected and shared to other users, thereby preventing leakage of other content in the first document.

In some embodiments of the present disclosure, the method further includes: in response to a first edit operation on the target document content, sending a first message to the server, so that the server sends a first update message to a second client, where the second client is a client of a third document associated with the target document content, and the first update message is used for updating the third document; or receiving a second update message from the server, and updating the target document content based on the second update message, where the second update message is generated by the server according to a second message sent by a third client, and the second message is generated based on editing of the target document content by the third client. In some embodiments of the present disclosure, documents referencing the same target document content in different terminals are automatically synchronized. If the target document content is amended in the first terminal, amended data are uploaded to the server and distributed to other terminals by the server, thereby amending the documents referencing the target document content in other terminals to ensure that all the documents referencing the target document content display the same content. For example, the server stores association relationships between documents and content blocks. In a case that a content block is changed, the server determines a document referencing the content block according to the previously established association relationship, and notifies other documents referencing the content block to update in real time.

The editing here is not limited to amendment but also includes deletion. In a case that a content block is deleted, the server sends a notification message to the associated documents according to the association relationship. After receiving the notification message, the associated documents may display that the content block has been deleted. For example, if there is a target reference identifier in the second terminal, after the target document content of the first document on the first terminal is amended, the target document content displayed after opening the target reference identifier in the second terminal should be the amended target document content, thereby ensuring uniformity of different documents and achieving automatic synchronization. Similarly, if there is a target reference identifier in the second terminal, after the target reference identifier is opened to display the target document content and the user amends the displayed target document content in the second terminal, the target document content displayed in the first document is also correspondingly amended, which can ensure uniformity of data in various places and facilitate collaborative work. In some embodiments, the editing includes amendment and deletion, that is, if the user having delete permission deletes the target document content in any terminal, other terminals also display that the target document content is deleted.

In some embodiments of the present disclosure, the method further includes: in response to a delete event of the target document content in the first document, changing the display style of the target reference identifier in the second document to a second style, where the second style is different from the first style of the target reference identifier in the second document before the target document content is deleted. In some embodiments, the second style has prompt information for prompting that the target document content has been deleted, and the style of the target reference identifier changes with the status of the target document content. Therefore, the user may directly determine the status of the target document content through the style of the target reference identifier. In the case that the target document content is deleted, the collection area may not display the target collection identifier associated with the deleted target document content, or display in the target collection identifier that the target document has been deleted.

Figure 2:
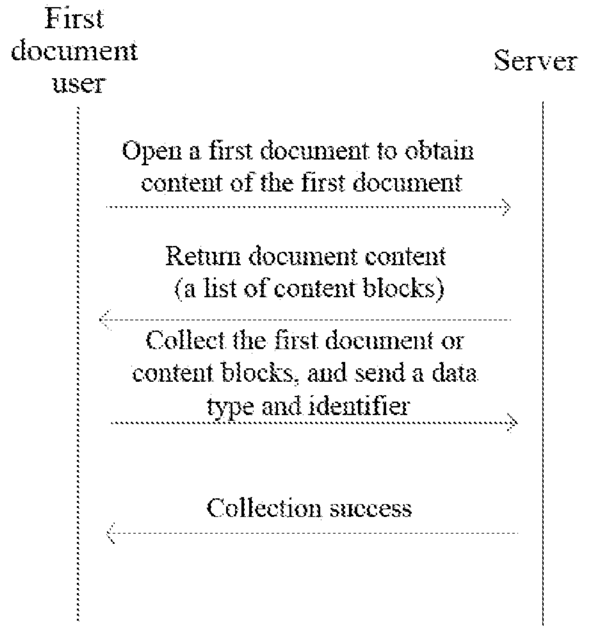
FIG. 2 is an interactive diagram of a collection process in an electronic document processing method according to an embodiment of the present disclosure.
Figure 3:
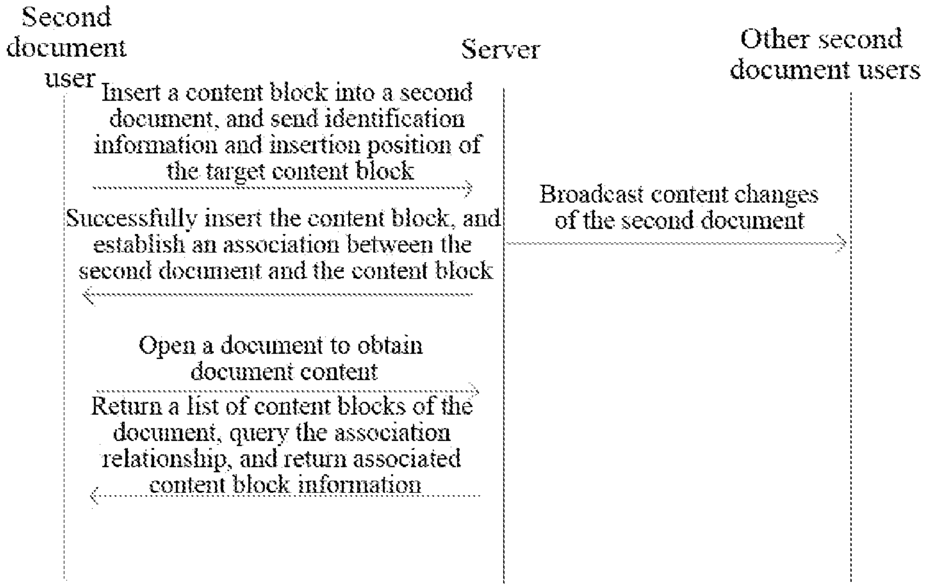
FIG. 3 is an interactive diagram of an association process in an electronic document processing method according to an embodiment of the present disclosure.
Figure 4:
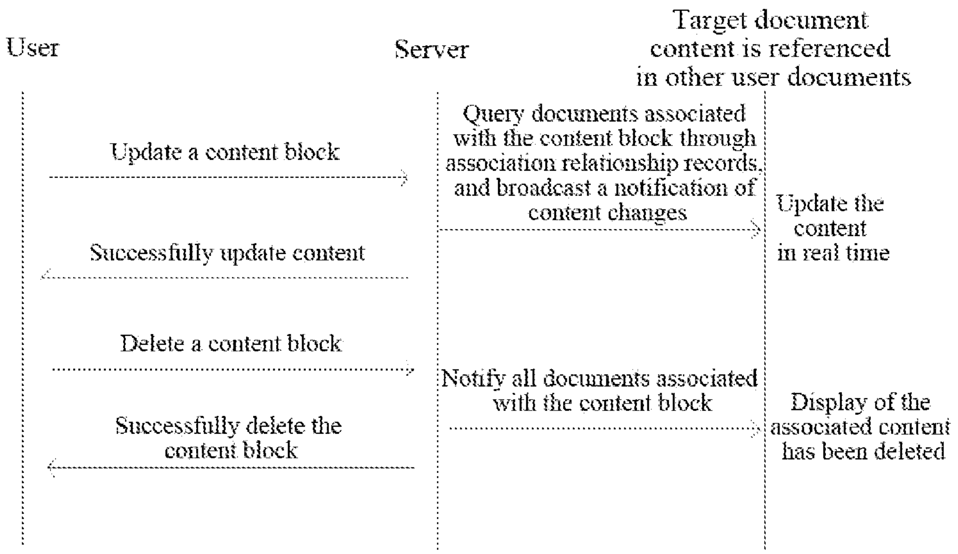
FIG. 4 is an interactive diagram of an update process in an electronic document processing method according to an embodiment of the present disclosure.

In order to better illustrate the method provided in the embodiments of the present disclosure, a specific embodiment is provided below. This embodiment will be illustrated below with reference to FIG. 2 to FIG. 4. In this embodiment, the first document is an electronic document and includes a plurality of content blocks, and each content block has globally unique ID (identification information). As shown in FIG. 2, a first document user may open the first document, obtain content of the first document from a server in response to opening the first document, and receive document content returned by the server, where the document content may include a list of content blocks. The returned document content is displayed. In a display interface of the first document, in response to a collection operation, collected data are determined and a data type and identifier of the collected data are obtained, where the data type may be either a document type or a content block type, and the identifier may be a document identifier or identification information of content blocks. If the collected data are the first document, the document identifier of the first document is obtained. If the collected data are content blocks, the identification information of the collected content blocks is obtained. When the first document or the content blocks are collected, the data type and identifier (the document identifier of the first document or identification information of the content blocks) are sent to the server, and the server returns a collection success message. After collection, a corresponding collection identifier is displayed in a collection area. For example, a list item is displayed in a collection list. For example, the collected data are target document content in the first document, the target document content is one or more content blocks, and the target collection identifier is displayed in the collection area after collection. After a content block of the first document is collected, as shown in FIG. 3, the user may insert the collected content block of the first document into a second document, and send the identification information and insertion position of the content block to the server in response to inserting the collected content block into the second document. The server broadcasts content changes of the second document to users of other second documents to synchronize the second document on the other terminals. After the content block is successfully inserted, the server establishes an association relationship between the second document and the inserted content block. The second document may directly display the inserted content block, or may display a connection identifier of the content block and display the inserted content block after the connection identifier is triggered. After the content block is inserted into the second document, the inserted content block may not belong to the second document but still belongs to the first document. Therefore, the association relationship needs to be established for query purposes. Continue to refer to FIG. 3. After opening a document (the opened document may be any document), the user obtains document content from the server in response to the opening operation on the document, and receives a list of content blocks of the document and associated information of the content blocks returned by the server, where the associated information of the content blocks is obtained by the server querying the association relationship of the document. Continue to refer to FIG. 4. The user updates any content block, and sends a message to the server in response to updating the content block, so that the server queries documents associated with the updated content block according to association relationship records, and broadcasts a notification of content changes to the associated documents, and content of the documents associated with the updated content block is updated in real time. Then a notification returned by the server that the content has been successfully updated is received. If the user deletes the content block, in response to deleting the content block, a notification is sent to the server, so that the server notifies all documents associated with the deleted content block. The documents associated with the deleted content block display that the associated content has been deleted. Then a notification returned by the server that the content block has been successfully deleted is received.

In this embodiment of the present disclosure, one or more content blocks in a document are collected, and a user does not need to collect a complete document but collects only a portion of the document, so that the information is more compact and facilitates user's quick browse and use. The collected content blocks may be reused and automatically updated synchronously. No matter whether the inserted document or the source document is edited, the edited content will be updated synchronously, thereby ensuring that the same content block is the same in different documents, without user's manual operation.

Figure 5:
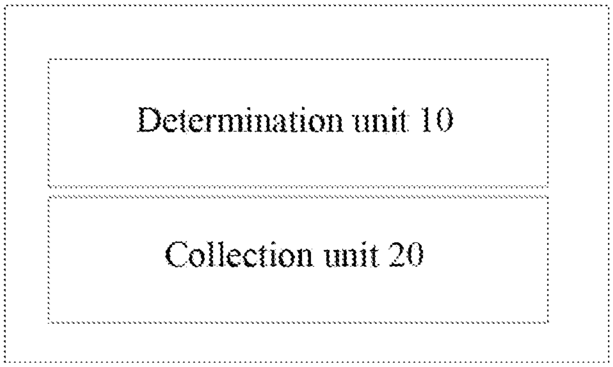
FIG. 5 is a schematic diagram of an electronic document processing apparatus according to an embodiment of the present disclosure.

In some embodiments of the present disclosure, an electronic document processing apparatus is further provided, as shown in FIG. 5, including:

a determining unit 10 configured to, in a display interface of a first document, in response to a first operation, determine target document content in the first document that is associated with the first operation, where the target document content is some content of the first document, the some content includes at least one content block, and each content block is a unit used for carrying content of the first document; and a collection unit 20 configured to, in response to a second operation, collect the target document content based on the content block included in the target document content.

In some embodiments of the present disclosure, the collection unit 20 collecting the target document content based on the content block included in the target document content includes: collecting the target document content in response to an operation on a collection control, where the collection control is displayed in response to the first operation or displayed at an associated position of the content block; or collecting the target document content in response to receiving a collection gesture or voice command.

In some embodiments of the present disclosure, the determination unit 10, in response to a first operation, determining target document content that is associated with the first operation includes: in response to a selection operation on some content in the first document, determining the some content as the target document content; or in response to a trigger operation on a collection control associated with the some content, determining the some content as the target document content.

In some embodiments of the present disclosure, the content block has identification information; and the collection unit 20, in response to a second operation, collecting the target document content based on the content block included in the target document content includes: obtaining the identification information of the content block included in the target document content, and storing the identification information of the content block in a collection database.

In some embodiments of the present disclosure, the apparatus further includes: a control unit configured to, in response to a first trigger operation, obtain and output collected content block information based on the identification information of the content block stored in the collection database; and in response to a second trigger operation on the collected content block information, process the content block selected by the second trigger operation in a manner corresponding to the second trigger operation.

In some embodiments of the present disclosure, the control unit processing the content block selected by the second trigger operation in a manner corresponding to the second trigger operation includes: determining the selected content block based on the second trigger operation and an insertion position of the selected content block in a target document; and inserting the selected content block into the insertion position in the target document.

In some embodiments of the present disclosure, inserting the selected content block into the insertion position includes: establishing an association relationship between the selected content block and the target document, and displaying the content block based on the association relationship.

In some embodiments of the present disclosure, inserting the selected content block into the insertion position includes: displaying the content block in a first preset style at the insertion position; or displaying the identification information of the content block in a second preset style at the insertion position, obtaining content of the content block based on the identification information of the content block in response to a trigger operation on the identification information, and displaying the content of the content block.

In some embodiments of the present disclosure, establishing an association relationship between the selected content block and the target document includes: maintaining an attribution relationship between the selected content block and the document to which the content block belongs unchanged, and establishing a reference relationship or connection relationship between the selected content block and the target document.

In some embodiments of the present disclosure, outputting collected content block information includes: outputting content information or identification information of the content block and at least one of the following: information of the document to which the content block belongs; collector information, collection time information, or collection tag information of the content block; and information of the first document.

In some embodiments of the present disclosure, collecting the target document content includes: sending a data type and content block identifier of the collected content to a server, where the data type includes a content block type.

In some embodiments of the present disclosure, the apparatus further includes: a sending unit configured to, in response to a third operation of collecting the first document, send a data type and document identifier of the collected first document to the server, where the data type of the first document includes a document type.

In some embodiments of the present disclosure, the apparatus further includes a display unit configured to display a target collection identifier associated with the target document content in a collection area after the target document content is displayed.

In some embodiments of the present disclosure, the target collection identifier includes at least one of content generated according to the target document content, the first document where the target document content is located, update time of the target document content, and creation time of the target collection identifier.

In some embodiments of the present disclosure, the apparatus further includes: a control unit configured to, in response to a fourth operation on the target collection identifier, open the first document and locate the target document content; or in response to a fourth operation on the target collection identifier, open the first document, display the target document content, and hide some or all content except the target document content.

In some embodiments of the present disclosure, the apparatus further includes: a control unit configured to, in response to a fifth operation on the target collection identifier, insert a target reference identifier or target connection identifier associated with the target document content into a second document, where the target reference identifier is used for displaying the target document content in a preset style, and the target connection identifier is triggered to display the target document content.

In some embodiments of the present disclosure, inserting a target reference identifier or target connection identifier associated with the target document content into a second document includes: sending a content block identifier and inserted location information of the target document content to the server, so that the server establishes an association relationship between the second document and the target document content.

In some embodiments of the present disclosure, the target reference identifier is displayed in a reference style; and the reference style includes at least one of a reference source document, reference update time, and referenced content.

In some embodiments of the present disclosure, after the target document content in the first document is amended, the target document content in the second document is correspondingly amended; and/or after the target document content in the second document is amended, the target document content displayed in the first document is correspondingly amended.

In some embodiments of the present disclosure, the control unit is further configured to, in response to a first edit operation on the target document content, send a first message to the server, so that the server sends a first update message to a second client, where the second client has a third document associated with the target document content, and the first update message is used for updating the third document; or further configured to receive a second update message from the server, and update the target document content based on the second update message, where the second update message is generated by the server according to a second message sent by a third client, and the second message is generated based on editing of associated target document content in the third document by the second client.

In some embodiments of the present disclosure, the control unit is further configured to, in response to a delete event of the target document content in the first document, change the display style of the target reference identifier in the second document to a second style, where the second style is different from the first style of the target reference identifier in the second document before the target document content is deleted.

The embodiment of the apparatus substantially corresponds to the embodiment of the method, so relevant parts may refer to the parts of the embodiment of the method. The embodiments of the apparatuses described above are merely illustrative, where the modules illustrated as separate modules may or may not be separate. Some or all of the modules may be selected according to actual needs to achieve the objectives of the solutions of the embodiments. Those of ordinary skill in the art may understand and implement without any creative effort.

The methods and apparatuses of the present disclosure are described above based on the embodiments and application examples. In addition, the present disclosure further provides a terminal and a storage medium, which are described below.

Figure 6:
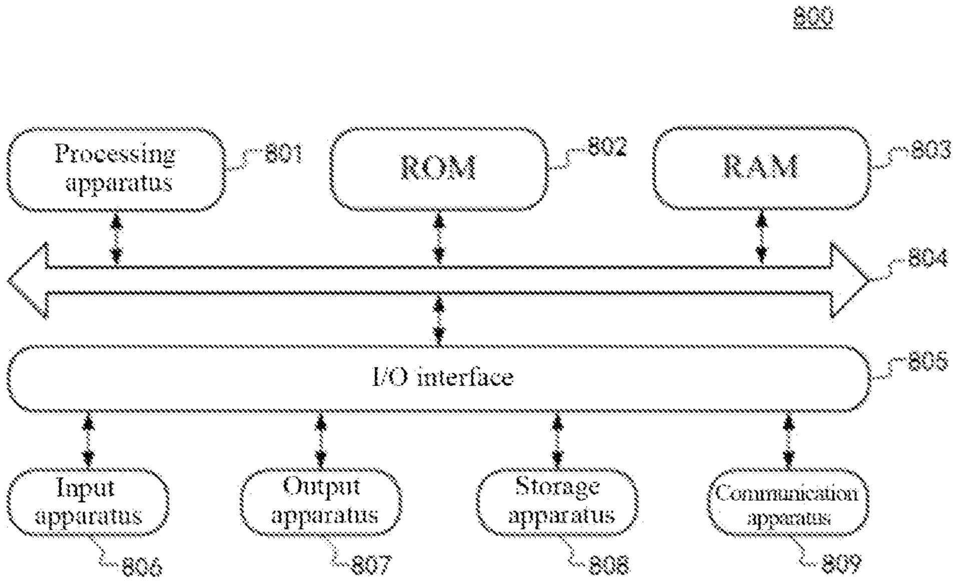
FIG. 6 is a schematic structural diagram of an electronic device according to an embodiment of the present disclosure.

Reference is made below to FIG. 6, which illustrates a schematic diagram of the structure of an electronic device (e.g., a terminal device or a server) 800 suitable for implementing an embodiment of the present disclosure. Terminal devices in embodiments of the present disclosure may include, but are not limited to, mobile terminals such as a cell phone, a laptop computer, a digital radio receiver, a PDA (personal digital assistant), a PAD (tablet computer), a PMP (portable multimedia player), an in-vehicle terminal (e.g., an in-vehicle navigation terminal), and the like, and a fixed terminal such as a digital TV, a desktop computer, and the like. The electronic device illustrated in the figures is only an example and should not impose any limitation on the functionality and scope of use of the embodiments of the present disclosure.

The electronic device 800 may include a processing device (e.g., central processor, graphics processor, etc.) 801 that may perform various appropriate actions and processes based on programs stored in a read-only memory (ROM) 802 or loaded from a storage apparatus 808 into a random access memory (RAM) 803. Also stored in RAM 803 are various programs and data required for the operation of electronic device 800. The processing device 801, ROM 802, and RAM 803 are connected to each other via bus 804. The input/output (I/O) interface 805 is also connected to the bus 804.

Typically, the following devices can be connected to I/O interface 805: input apparatus 806 including, for example, touch screens, touch pads, keyboards, mice, cameras, microphones, accelerometers, gyroscopes, etc.; output apparatus 807 including, for example, liquid crystal displays (LCDs), speakers, vibrators, etc.; storage apparatus 808 including, for example, magnetic tapes, hard drives, etc.; and communication apparatus 809. communication apparatus 809 may allow the electronic device 800 to communicate wirelessly or wired with other devices to exchange data. Although the drawings illustrate the electronic device 800 with various devices, it should be understood that it is not required to implement or have all of the devices illustrated. More or fewer devices may alternatively be implemented or available.

In particular, according to embodiments of the present disclosure, the process described above with reference to the flowchart may be implemented as a computer software program. For example, embodiments of the present disclosure include a computer program product comprising a computer program carried on a computer readable medium, the computer program comprising program code for performing the method shown in the flowchart. In such an embodiment, the computer program may be downloaded and installed from a network via a communication apparatus 809, or from a storage apparatus 808, or from a ROM 802. When this computer program is executed by the processing device 801, the above-described functions as defined in the method of this disclosed embodiment are performed.

It is to be noted that the computer-readable medium described above in this disclosure may be a computer-readable signal medium or a computer-readable storage medium or any combination of the above. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above, magnetic memory devices, or any suitable combination of the foregoing. In the present disclosure, a computer-readable storage medium may be any tangible medium that contains or stores a program that may be used by or in combination with an instruction execution system, device, or device. And in the present disclosure, a computer-readable signal medium may include a data signal propagated in the baseband or as part of a carrier wave that carries computer-readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in combination with the instruction execution system, device or device. The program code contained on the computer-readable medium may be transmitted using any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LAN"), wide area networks ("WAN"), internetworks (e.g., the Internet), and end-to-end networks (e.g., ad hoc end-to-end networks), as well as any currently known or future developed networks.

The above-mentioned computer-readable medium may be included in the above-mentioned electronic device; or may be separate and not assembled into the electronic device.

The above computer readable medium carries one or more programs that, when executed by the electronic device, cause the electronic device to perform the methods of the present disclosure as described above.

Computer program code for performing the operations of the present disclosure may be written in one or more programming languages or combinations thereof, said programming languages including object-oriented programming languages—such as Java, Smalltalk, C++, and also including conventional procedural programming languages—such as "C" language or similar programming languages. The program code may be executed entirely on the user's computer, partially on the user's computer, as a stand-alone package, partially on the user's computer and partially on a remote computer, or entirely on a remote computer or server. In the case of a remote computer, the remote computer may be connected to the user computer over any kind of network—including a local area network (LAN) or a wide area network (WAN)—or, alternatively, may be connected to an external computer (e.g., using an Internet service provider to connect over the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in the embodiments of the present disclosure may be implemented by means of software, or they may be implemented by means of hardware. Wherein, the name of the unit does not in some cases constitute a limitation of the unit itself.

The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

In the context of this disclosure, a machine-readable medium may be a tangible medium that may contain or store a program for use by or in conjunction with an instruction execution system, device, or apparatus. The machine-readable medium may be a machine-readable signal medium or a machine-readable storage medium. Machine readable media may include, but are not limited to, electronic, magnetic, optical, electromagnetic, infrared, or semiconductor systems, devices, or equipment, or any suitable combination of the foregoing. More specific examples of machine-readable storage media would include one or more wire-based electrical connections, portable computer disks, hard disks, random access memory (RAM), read-only memory (ROM), erasable programmable read-only memory (EPROM or flash memory), optical fiber, convenient compact disk read-only memory (CD-ROM), optical storage devices, magnetic storage devices, or any suitable combination of the above any suitable combination of the above.

According to one or more embodiments, the present disclosure provides an electronic document processing method, comprising: in a display interface of a first document, in response to a first operation, determining target document content in the first document that is associated with the first operation;

wherein the target document content is some content of the first document, the some content comprises at least one content block, and each content block is a unit used for carrying content of the first document; and in response to a second operation, collecting the target document content based on the content block comprised in the target document content.

According to one or more embodiments, the present disclosure provides an electronic document processing method, the in response to a second operation, collecting the target document content based on the content block comprised in the target document content comprises: collecting the target document content in response to an operation on a collection control, wherein the collection control is displayed in response to the first operation or displayed at an associated position of the content block; or collecting the target document content in response to receiving a collection gesture or voice command.

According to one or more embodiments, the present disclosure provides an electronic document processing method, the in response to a first operation, determining target document content that is associated with the first operation comprises: in response to a selection operation on some content in the first document, determining the some content as the target document content; or in response to a trigger operation on a collection control associated with the some content, determining the some content as the target document content.

According to one or more embodiments, the present disclosure provides an electronic document processing method, the content block has identification information; and the in response to a second operation, collecting the target document content based on the content block comprised in the target document content comprises: obtaining the identification information of the content block comprised in the target document content, and storing the identification information of the content block in a collection database.

According to one or more embodiments, the present disclosure provides an electronic document processing method, further comprising:

in response to a first trigger operation, obtaining and outputting collected content block information based on the identification information of the content block stored in the collection database; and in response to a second trigger operation on the collected content block information, processing the content block selected by the second trigger operation in a manner corresponding to the second trigger operation.

According to one or more embodiments, the present disclosure provides an electronic document processing method, the processing the content block selected by the second trigger operation in a manner corresponding to the second trigger operation comprises: determining the selected content block based on the second trigger operation and an insertion position of the selected content block in a target document; and inserting the selected content block into the insertion position in the target document.

According to one or more embodiments, the present disclosure provides an electronic document processing method, the inserting the selected content block into the insertion position comprises: establishing an association relationship between the selected content block and the target document, and displaying the content block based on the association relationship.

According to one or more embodiments, the present disclosure provides an electronic document processing method, the inserting the selected content block into the insertion position comprises: displaying the content block in a first preset style at the insertion position; or displaying the identification information of the content block in a second preset style at the insertion position, obtaining content of the content block based on the identification information of the content block in response to a trigger operation on the identification information, and displaying the content of the content block.

According to one or more embodiments, the present disclosure provides an electronic document processing method, the establishing an association relationship between the selected content block and the target document comprises: maintaining an attribution relationship between the selected content block and the document to which the content block belongs unchanged, and establishing a reference relationship or connection relationship between the selected content block and the target document.

According to one or more embodiments, the present disclosure provides an electronic document processing method, the outputting collected content block information comprises: outputting content information or identification information of the content block and at least one of the following: information of the document to which the content block belongs; collector information, collection time information, or collection tag information of the content block; and information of the first document.

According to one or more embodiments, the present disclosure provides an electronic document processing method, the collecting the target document content comprises: sending a data type and content block identifier of the collected content to a server, wherein the data type comprises a content block type.

According to one or more embodiments, the present disclosure provides an electronic document processing method, further comprising: in response to a third operation of collecting the first document, sending a data type and document identifier of the collected first document to the server, wherein the data type of the first document comprises a document type.

According to one or more embodiments, the present disclosure provides an electronic document processing method, after the target document content is collected, a target collection identifier associated with the target document content is displayed in a collection area.

According to one or more embodiments, the present disclosure provides an electronic document processing method, the target collection identifier comprises at least one of content generated according to the target document content, the first document where the target document content is located, update time of the target document content, and creation time of the target collection identifier.

According to one or more embodiments, the present disclosure provides an electronic document processing method, further comprising: in response to a fourth operation on the target collection identifier, opening the first document and locating the target document content; or in response to a fourth operation on the target collection identifier, opening the first document, displaying the target document content, and hiding some or all content except the target document content.

According to one or more embodiments, the present disclosure provides an electronic document processing method, further comprising: in response to a fifth operation on the target collection identifier, inserting a target reference identifier or target connection identifier associated with the target document content into a second document, wherein the target reference identifier is used for displaying the target document content in a preset style, and the target connection identifier is triggered to display the target document content. According to one or more embodiments, the present disclosure provide an electronic document processing method, the inserting a target reference identifier or target connection identifier associated with the target document content into a second document comprises: sending a content block identifier and inserted location information of the target document content to the server, so that the server establishes an association relationship between the second document and the target document content.

According to one or more embodiments, the present disclosure provides an electronic document processing method, the target reference identifier is displayed in a reference style; and the reference style comprises at least one of a reference source document, reference update time, and referenced content.

According to one or more embodiments, the present disclosure provides an electronic document processing method, after the target document content in the first document is amended, the target document content in the second document is correspondingly amended; and/or, after the target document content in the second document is amended, the target document content displayed in the first document is correspondingly amended.

According to one or more embodiments, the present disclosure provides an electronic document processing method, further comprising: in response to a first edit operation on the target document content, sending a first message to the server, so that the server sends a first update message to a second client, wherein the second client has a third document associated with the target document content, and the first update message is used for updating the third document; or receiving a second update message from the server, and updating the target document content based on the second update message, wherein the second update message is generated by the server according to a second message sent by a third client, and the second message is generated based on editing of associated target document content in the third document by the second client.

According to one or more embodiments, the present disclosure provides an electronic document processing method, further comprising: in response to a delete event of the target document content in the first document, changing the display style of the target reference identifier in the second document to a second style, wherein the second style is different from the first style of the target reference identifier in the second document before the target document content is deleted.

According to one or more embodiments, the present disclosure provides an electronic document processing apparatus, comprising: a determining unit configured to, in a display interface of a first document, in response to a first operation, determine target document content in the first document that is associated with the first operation, wherein the target document content is some content of the first document, the some content comprises at least one content block, and each content block is a unit used for carrying content of the first document; and a collection unit configured to, in response to a second operation, collect the target document content based on the content block comprised in the target document content.

According to one or more embodiments, the present disclosure provides a terminal, comprising: at least one memory and at least one processor;

Wherein the at least one memory is configured to store program code, and the at least one processor is configured to call the program code stored in the at least one memory to perform the method according to any one of above.

According to one or more embodiments, the present disclosure provides a storage medium, the storage medium storing program code, and the program code being used for performing the method according to any one of above.

The above description is only a better embodiment of the present disclosure and a description of the technical principles applied. It should be understood by those skilled in the art that the scope of the disclosure covered by the present disclosure is not limited to technical solutions formed by specific combinations of the above technical features, but should also cover other technical solutions formed by any combination of the above technical features or their equivalent features without departing from the above disclosed idea. For example, the above features are interchangeable with (but not limited to) technical features with similar functions disclosed in the present disclosure.

Further, while the operations are depicted in a particular order, this should not be construed as requiring that the operations be performed in the particular order shown or in sequential order. Multitasking and parallel processing may be advantageous in certain environments. Again, while several specific implementation details are included in the above discussion, these should not be construed as limiting the scope of the present disclosure. Certain features described in the context of separate embodiments may also be implemented in combination in a single embodiment. Conversely, the various features described in the context of a single embodiment may also be implemented in multiple embodiments individually or in any suitable sub-combination.

Although the present subject matter has been described using language specific to structural features and/or method logical actions, it should be understood that the subject matter as defined in the appended claims is not necessarily limited to the particular features or actions described above. Rather, the particular features and actions described above are merely exemplary forms of claim fulfillment.

What is claimed is:

1. An electronic document processing method, comprising:

in a display interface of a first document, in response to a first operation, determining target document content in the first document that is associated with the first operation, wherein the target document content is some content of the first document, the some content is carried in at least one content block, and each content block is a unit configured to carry content of the first document;

displaying a collection control with a first style in response to the first operation, wherein the collection control with the first style corresponds to the at least one content block and is configured to collect the target document content for convenient review or manipulation at a later time;

in response to a second operation performed on the collection control with the first style, collecting the target document content based on the at least one content block, wherein the collecting the target document content based on the at least one content block comprises:

obtaining identification information of the at least one content block, and storing the identification information of the at least one content block as one of collections in a collection database;

receiving a post-collection operation, wherein the post-collection operation is associated with the target document content in the first document;

displaying the collection control with a second style in response to the post-collection operation, wherein the collection control with the second style indicates that the target document content was previously collected;

determining a type from a plurality of types of collected content during a collection process, wherein the plurality of types of collected content comprise a first type indicating that an entire document is collected, and the plurality of types further comprise a second type indicating that partial content of a document is collected;

automatically classifying the collections based on the plurality of types of collected content;

displaying, in a collection area, the collections in different display styles to distinguish the first type from the second type;

outputting collected content block information based on identification information of content blocks stored in the collection database; and inserting a selected content block at an insertion position of a target document in response to receiving user input.

2. The method according to claim 1, wherein the in response to a second operation, collecting the target document content based on the content block comprised in the target document content comprises:

collecting the target document content in response to an operation on the collection control with the first style, wherein the collection control with the first style is displayed in response to the first operation or displayed at an associated position of the content block; or collecting the target document content in response to receiving a collection gesture or voice command;

and/or;

wherein the in response to a first operation, determining target document content that is associated with the first operation comprises:

in response to a selection operation on some content in the first document, determining the some content as the target document content; or in response to a trigger operation on a collection control associated with the some content, determining the some content as the target document content.

3. The method according to claim 1, further comprising:

in response to a first trigger operation, obtaining and outputting the collected content block information based on the identification information of the content blocks stored in the collection database.

4. The method according to claim 3, further comprising:

determining the selected content block based on a second trigger operation on the collected content block information.

5. The method according to claim 3, wherein the outputting collected content block information comprises:

outputting content information or identification information of the content block and at least one of the following:

information of the document to which the content block belongs;

collector information, collection time information, or collection tag information of the content block; and information of the first document.

6. The method according to claim 1, wherein the inserting the selected content block into the insertion position comprises:

establishing an association relationship between the selected content block and the target document, and displaying the content block based on the association relationship.

7. The method according to claim 6, wherein the establishing an association relationship between the selected content block and the target document comprises:

maintaining an attribution relationship between the selected content block and the document to which the content block belongs unchanged, and establishing a reference relationship or connection relationship between the selected content block and the target document.

8. The method according to claim 1, wherein the inserting the selected content block into the insertion position comprises:

displaying the content block in a first preset style at the insertion position; or displaying the identification information of the content block in a second preset style at the insertion position, obtaining content of the content block based on the identification information of the content block in response to a trigger operation on the identification information, and displaying the content of the content block.

9. The method according to claim 1, wherein the collecting the target document content comprises:

sending the determined type and the identification information of the at least one content block to a server, wherein the determined type is the second type among the plurality of types of collected content.

10. The method according to claim 9, further comprising:

in response to a third operation of collecting an entirety of the first document, sending the first type and document identifier of the collected first document to the server.

11. The method according to claim 1, further comprising:

displaying a target collection identifier associated with the target document content in a collection area in response to determining that the target document content has been collected.

12. The method according to claim 11, wherein the target collection identifier comprises at least one of content generated according to the target document content, the first document where the target document content is located, update time of the target document content, and creation time of the target collection identifier;

and/or;

the electronic document processing method, further comprising:

in response to a fourth operation on the target collection identifier, opening the first document and locating the target document content; or in response to a fourth operation on the target collection identifier, opening the first document, displaying the target document content, and hiding some or all content except the target document content.

13. The method according to claim 11, further comprising:

in response to a fifth operation on the target collection identifier, inserting a target reference identifier or target connection identifier associated with the target document content into a second document, wherein the target reference identifier is used for displaying the target document content in a preset style, and the target connection identifier is triggered to display the target document content.

14. The method according to claim 13, wherein the inserting a target reference identifier or target connection identifier associated with the target document content into a second document comprises:

sending a content block identifier and inserted location information of the target document content to the server, so that the server establishes an association relationship between the second document and the target document content.

15. The method according to claim 13, wherein the target reference identifier is displayed in a reference style; and the reference style comprises at least one of a reference source document, reference update time, and referenced content;

and/or;

after the target document content in the first document is amended, the target document content in the second document is correspondingly amended; and/or after the target document content in the second document is amended, the target document content displayed in the first document is correspondingly amended.

16. The method according to claim 13, further comprising:

in response to a first edit operation on the target document content, sending a first message to the server, so that the server sends a first update message to a second client, wherein the second client has a third document associated with the target document content, and the first update message is used for updating the third document; or receiving a second update message from the server, and updating the target document content based on the second update message, wherein the second update message is generated by the server according to a second message sent by a third client, and the second message is generated based on editing of associated target document content in the third document by the second client.

17. The method according to claim 13, further comprising:

in response to a delete event of the target document content in the first document, changing the display style of the target reference identifier in the second document to a second style, wherein the second style is different from the first style of the target reference identifier in the second document before the target document content is deleted.

18. A terminal, comprising:

at least one memory and at least one processor, wherein the at least one memory is configured to store program code, and the at least one processor is configured to call the program code stored in the at least one memory to perform operations comprising:

in a display interface of a first document, in response to a first operation, determining target document content in the first document that is associated with the first operation, wherein the target document content is some content of the first document, the some content is carried in at least one content block, and each content block is a unit configured to carry content of the first document;

displaying a collection control with a first style in response to the first operation, wherein the collection control with the first style corresponds to the at least one content block and is configured to collect the target document content for convenient review or manipulation at a later time;

in response to a second operation performed on the collection control with the first style, collecting the target document content based on the at least one content block, wherein the collecting the target document content based on the at least one content block comprises:

obtaining identification information of the at least one content block, and storing the identification information of the at least one content block as one of collections in a collection database;

receiving a post-collection operation, wherein the post-collection operation is associated with the target document content in the first document;

displaying the collection control with a second style in response to the post-collection operation, wherein the collection control with the second style indicates that the target document content was previously collected;

determining a type from a plurality of types of collected content during a collection process, wherein the plurality of types of collected content comprise a first type indicating that an entire document is collected, and the plurality of types further comprise a second type indicating that partial content of a document is collected;

automatically classifying the collections based on the plurality of types of collected content;

displaying, in a collection area, the collections in different display styles to distinguish the first type from the second type;

outputting collected content block information based on identification information of content blocks stored in the collection database; and inserting a selected content block at an insertion position of a target document in response to receiving user input.

19. A non-transitory storage medium, the storage medium storing computer program code, and the program code upon execution by a computer causes the computer to perform operations comprising:

in a display interface of a first document, in response to a first operation, determining target document content in the first document that is associated with the first operation, wherein the target document content is some content of the first document, the some content is carried in at least one content block, and each content block is a unit configured to carry content of the first document;

displaying a collection control with a first style in response to the first operation, wherein the collection control with a first style corresponds to the at least one content block and is configured to collect the target document content for convenient review or manipulation at a later time;

in response to a second operation performed on the collection control with a first style, collecting the target document content based on the at least one content block, wherein the collecting the target document content based on the at least one content block comprises:

obtaining identification information of the at least one content block, and storing the identification information of the at least one content block as one of collections in a collection database;

receiving a post-collection operation, wherein the post-collection operation is associated with the target document content in the first document;

displaying the collection control with a second style in response to the post-collection operation, wherein the collection control with the second style indicates that the target document content was previously collected;

determining a type from a plurality of types of collected content during a collection process, wherein the plurality of types of collected content comprise a first type indicating that an entire document is collected, and the plurality of types further comprise a second type indicating that partial content of a document is collected;

automatically classifying the collections based on the plurality of types of collected content;

displaying, in a collection area, the collections in different display styles to distinguish the first type from the second type;

outputting collected content block information based on identification information of content blocks stored in the collection database; and inserting a selected content block at an insertion position of a target document in response to receiving user input.

* * * * *